United States Patent
Sillard et al.

(10) Patent No.: US 9,638,856 B2
(45) Date of Patent: May 2, 2017

(54) FEW MODE OPTICAL FIBERS FOR SPACE DIVISION MULTIPLEXING

(71) Applicant: DRAKA COMTEQ BV, Amsterdam (NL)

(72) Inventors: Pierre Sillard, Le Chesnay (FR); Denis Molin, Draveil (FR); Marianne Bigot-Astruc, Janvry (FR)

(73) Assignee: DRAKA COMTEQ BV, Amsterdam (NL)

( * ) Notice: Subject to any disclaimer, the term of this patent is extended or adjusted under 35 U.S.C. 154(b) by 0 days.

(21) Appl. No.: 15/023,028

(22) PCT Filed: Sep. 20, 2013

(86) PCT No.: PCT/IB2013/002412
§ 371 (c)(1),
(2) Date: Mar. 18, 2016

(87) PCT Pub. No.: WO2015/040446
PCT Pub. Date: Mar. 26, 2015

(65) Prior Publication Data
US 2016/0223743 A1    Aug. 4, 2016

(51) Int. Cl.
*G02B 6/26* (2006.01)
*G02B 6/028* (2006.01)
(Continued)

(52) U.S. Cl.
CPC ......... *G02B 6/0288* (2013.01); *G02B 6/0365* (2013.01); *G02B 6/03627* (2013.01);
(Continued)

(58) Field of Classification Search
USPC ........................................................ 385/28
See application file for complete search history.

(56) References Cited

U.S. PATENT DOCUMENTS

2012/0328255 A1  12/2012  Bickham
2013/0071114 A1  3/2013  Bickham et al.
(Continued)

FOREIGN PATENT DOCUMENTS

| WO | 2011/094400 A3 | 4/2011 |
| WO | 2012/161809 A1 | 11/2012 |
| WO | 2013/126254 A1 | 8/2013 |

OTHER PUBLICATIONS

International Preliminary Report on Patentability for PCT/IB2013/002412 dated Mar. 22, 2016 (9 pages).
(Continued)

*Primary Examiner* — Eric Wong
(74) *Attorney, Agent, or Firm* — Shumaker, Loop & Kendrick, LLP

(57) ABSTRACT

The invention relates to an optical fiber comprising an optical core and an optical cladding surrounding the optical core, the optical core having a single α graded-index profile with $\alpha \geq 1$, and the optical core having a radius R1 and a maximal refractive index $n_0$, said optical cladding having a refractive index $n_{Cl}$. Said optical cladding comprises a region of depressed refractive index $n_{trench}$, having an inner radius $R_2$, with $R_2 \geq R_1$, and an outer radius R3, with R3>R2. According to embodiments of the invention, the α-value of said graded index profile and the optical core radius $R_1$ are chosen such that $R_1 \geq 13.5$ µm and so as to satisfy a criterion C of quality. Thus, the invention provides a few-mode optical fiber, which allow guiding an increased number of LP modes as compared to prior art FMFs, while reaching the lowest Differential Mode Group Delay. The system reach is thus increased over prior art.

18 Claims, 6 Drawing Sheets

(51) Int. Cl.
*G02B 6/036* (2006.01)
*H04J 14/04* (2006.01)
*H04B 10/25* (2013.01)
*H04J 14/00* (2006.01)
*G02B 6/02* (2006.01)

(52) U.S. Cl.
CPC .......... *H04B 10/2504* (2013.01); *H04J 14/00* (2013.01); *H04J 14/04* (2013.01); *G02B 6/02023* (2013.01)

(56) References Cited

U.S. PATENT DOCUMENTS

2013/0071115 A1    3/2013   Bennett et al.
2013/0216181 A1*   8/2013   Bickham ................ G02B 6/268
                                                                                      385/28

OTHER PUBLICATIONS

International Search Report for PCT/IB2013/002412 dated Mar. 25, 2014 (2 pages).

* cited by examiner

FEW MODE OPTICAL FIBERS FOR SPACE
DIVISION MULTIPLEXING

CROSS-REFERENCE TO RELATED APPLICATION

This 35 U.S.C. §371 U.S. National Stage Application claims priority from PCT/IB2013/002412 filed Sep. 30, 2013, the entirety of which is incorporated herein by reference.

FIELD OF THE INVENTION

The invention relates to the field of fiber optic transmission, and, more specifically, to improved few-mode fiber designs for space division multiplexing.

BACKGROUND

An optical fiber is conventionally constituted of an optical core, which transmits an optical signal, and of an optical cladding, which confines the optical signal within the optical core. To that end the refractive index of the core, $n_c$, is greater than the one of the cladding, $n_{Cl}$. An optical fiber is generally characterized by a refractive index profile that associates the refractive index (n) with the radius (r) of the optical fiber: the distance r with respect to the center of the optical fiber is shown on x-axis and the difference Dn between the refractive index at radius r, n(r), and the refractive index of the optical cladding $n_{Cl}$ is shown on y-axis.

Nowadays, two main categories of optical fibers exist: multimode fibers and single-mode fibers. In a multimode fiber, for a given wavelength, several optical modes are propagated simultaneously along the optical fiber, whereas in a single-mode fiber, the higher order modes (hereafter called HOMs) are cut-off or highly attenuated.

Single-mode fibers are commonly used for long-distance applications, such as access networks or metropolitan networks. To obtain an optical fiber capable to transmit a single-mode optical signal, a core with a relatively small diameter is required (typically between 5 µm and 11 µm). To meet requirements of high speed or bit-rate applications (for example 10 Gbps), standard single-mode fibers require use of a modulated single-mode laser emitter tuned to work typically at a wavelength of 1550 nm. However, single-mode fibers suffer from nonlinearity problems, which are major limitations on fiber transmission capacity.

Multimode fibers are commonly used for short-distance applications requiring a high bandwidth, such as local area networks (LANs) and multi-dwelling units (MDUs), more generally known as in-building networks. The core of a multimode fiber typically has a diameter of 50 µm, or 62.5 µm. The most prevalent multimode fibers in telecommunications are the refractive graded-index profile optical fibers. By minimizing the intermodal dispersion (i.e. the difference between the propagation delay times or group velocity of the optical modes along the optical fiber, also called DMGD for Differential Mode Group Delay), such a refractive index profile guaranties a high modal bandwidth for a given wavelength.

Since data traffic over fiber optic networks continues to grow exponentially, there is an increasing demand for increasing per-fiber traffic particularly across long distances. To this end, multiplexing techniques have been developed that allow a plurality of separate data streams to share the same optical fiber. Among these techniques, one promising approach is space division multiplexing (SDM), in which a plurality of data channels within a single optical fiber are provided by a respective plurality of optical signal modes guided by the fiber.

Such a technique has required the development of new types of optical fibers, called few-mode optical fibers, which support more than one spatial mode but fewer spatial modes than the multi-mode fibers. Such few-mode fibers, which are notably discussed in the PCT patent document WO2011/094400, support approximately 2 to 50 modes. They can be configured so as to not have the modal dispersion problems that occur in multi-mode fibers.

Space-division-multiplexed transmissions using Few-Mode Fibers (FMFs) have hence recently received considerable attention because of their potential to multiply the capacity of single-mode transmissions by the number of modes that will be used.

One approach to the design of Few-Mode Fibers consists of minimizing the Differential Mode Group Delays (DMGDs, i.e. the difference in the respective arrival times of the guided modes used for spatial multiplexing), so that all modes can be simultaneously detected using complex 2N×2N (N being the total number of spatial modes, i.e. including LP (Linear Polarization) mode degeneracies) MIMO techniques, regardless mode-coupling phenomena that is one of the limiting factor to bridge long distances. This optimization, however, becomes more and more difficult when the number of LP modes increases.

It has to be noted, however, that less complex MIMO techniques may be used by grouping LP modes having close effective index differences, and detecting groups of LP modes, instead of individual LP modes.

A first known solution is disclosed in the US 2013/0071114 patent document, which describes a few mode optical fiber suitable for use in a mode division multiplexing optical transmission system. Such an optical fiber has a single alpha graded-index core with a radius $R_1$ (with values up to 11.4 µm in the disclosed embodiments), an alpha value greater than or equal to about 2.3 and less than about 2.7 at a wavelength of 1550 nm, and a maximum relative refractive index $\Delta_{1MAX}$ from about 0.3% to about 0.6% relative to the cladding. The optical fiber also has an effective area greater than about 90 µm² and less than about 160 µm². The cladding has a maximum relative refractive index $\Delta_{4MAX}$ such that $\Delta_{1MAX} > \Delta_{4MAX}$, and the differential group delay between the LP01 and LP11 modes is less than about 0.5 ns/km at a wavelength of 1550 nm.

However, according to this first known solution, the core and cladding support only the LP01 and LP11 modes at wavelengths greater than 1500 nm, which is a too small number of modes compared to the increasing demand on per-fiber transmission capacity.

A second known solution is disclosed in US 2013/007115, which disclose another specific design for Few-Mode Fibers. However, like the first known solution disclosed in US 2013/0071114, this second known-solution also consists in a FMF supporting only two guided modes.

Other known designs have led to FMFs supporting up to 4 or even 6 modes.

The PCT patent document WO 2012/161809 thus discloses a few-mode optical fiber comprising a core surrounded by a cladding, having a graded index profile that is structured to support propagation of a plurality of desired signal-carrying modes, while suppressing undesired modes. The core and cladding are configured such that the undesired modes have respective effective indices that are close to, or less than, the cladding index such that the undesired modes are leaky modes. The index spacing between the desired mode having the lowest effective index and the leaky mode with the highest effective index is sufficiently large so as to substantially prevent coupling therebetween. FMF supporting up to 4 modes are shown in examples.

The US 2012/0328255 patent document discloses few-mode optical fibers including a glass core and a glass cladding surrounding and in direct contact with the glass core. The glass core may include a radius $R_1$ from about 8 μm to about 13 μm; a graded refractive index profile with an alpha value between about 1.9 and 2.1 at a wavelength of 1550 nm; and a maximum relative refractive index $\Delta_{1MAX}$ from about 0.6% to about 0.95% relative to the glass cladding. The effective area of the LP01 mode at 1550 nm may be between 80 μm$^2$ and 105 μm$^2$ such that the core supports the propagation and transmission of an optical signal with X LP modes at a wavelength of 1550 nm, wherein X is an integer greater than 1 and less than 10. The glass cladding may include a maximum relative refractive index $\Delta_{4MAX}$ such that $\Delta_{1MAX} > \Delta_{4MAX}$. FMF supporting up to 6 modes are shown in examples.

Although such designs are promising, they do not allow reducing the Differential Mode Group Delays as much as desired, and therefore induce limits in the transmission system reach. In addition, the profiles disclosed in both documents are not optimized to ensure low bend losses and high leakage losses, which, however, are important issues for FMFs. Actually, none of the known documents relating to FMFs addresses the issue of designing a few-mode fiber showing low bend losses and high leakage losses.

Accordingly, a need exists for designs for Few-Mode optical Fibers guiding 4 LP modes or more, with small differential mode group delays, low bend losses and high leakage losses.

SUMMARY OF THE INVENTION

In one particular embodiment of the invention, an optical fiber is proposed comprising an optical core and an optical cladding surrounding the optical core, the optical core having a single α graded-index profile with α≤1, α being a non-dimensional parameter that defines the index profile shape of the optical core, and the optical core having a radius $R_1$ and a maximal refractive index $n_0$, said optical cladding having at its outer edge a refractive index $n_{Cl}$. Said optical cladding comprises a region of depressed refractive index $n_{trench}$, called a trench, surrounding the optical core, said trench having an inner radius $R_2$, with $R_2 \geq R_1$, and an outer radius $R_3$, with $R_3 > R_2$.

Said optical fiber is such that said optical core radius $R_1$ satisfies a criterion C of quality of optical communications defined by the following equation:

$$C = 10 \cdot \frac{\text{Max}|DMGDs|}{(R_1^2 \cdot Dn_1)^3}$$

where DMGD is the Differential Mode Group Delay between two guided modes in said optical fiber, where Max|DMGDs| is the absolute maximum value of DMGD between any combination of guided modes and where $Dn_1 = n_0 - n_{Cl}$ is the core-cladding index difference at $\lambda = \lambda_C$, where $\lambda_c$ is a central transmission wavelength of an operating band for which said optical fiber is intended. Moreover, said α-value of said graded index profile and said optical core radius $R_1$ are chosen such that $R_1 \geq 13.5$ μm and C<18.

As used herein, and unless otherwise specified, the term "single α graded-index profile" refers to an optical core having a refractive index profile n(r) defined as follows:

$$n(r) = n_0 \cdot \sqrt{1 - 2 \cdot \Delta \cdot \left(\frac{r}{R_1}\right)^\alpha} \quad r \leq R_1$$

where:
r is a variable representative of the radius of the optical fiber,
$R_1$ is the optical core radius,
$\Delta$ is the normalized refractive index difference, with $$\Delta = \frac{n_0^2 - n_1^2}{2n_0^2}$$

$n_1$ is the minimal refractive index of the optical core,
$n_0$ is the maximal refractive index of the optical core,
α is a non-dimensional parameter that defines the index profile shape of the optical core.

An alpha parameter α=2 corresponds to an inverted parabola. An alpha parameter α=1 corresponds to a triangular shape, while an alpha parameter α=∞ corresponds to a step function.

The grading of the index can be tailored to reduce group velocity mismatch between the low-loss core-guided modes.

Thus, by adapting the α-value of the graded index core and the core diameter, in order to satisfy a criterion of quality defined by the above-mentioned equation, the invention provides a few-mode optical fiber, which allow guiding an increased number of LP modes as compared to prior art FMFs, while reaching the lowest Differential Mode Group Delay. Such low DMGD allow all modes being simultaneously detected using 2N×2N (N being the total number of spatial modes, i.e. including LP mode degeneracies) MIMO ("Multiple Input Multiple Output") techniques, regardless mode coupling phenomena. The system reach is thus increased over prior art.

It has to be noted, however, that less complex MIMO techniques could also be used, to detect groups of modes showing close effective index differences, instead of detecting all modes individually.

Having a core radius $R_1 \geq 13.5$ μm allows guiding a higher number of modes, as compared to prior art techniques, such as those disclosed in the US 2012/0328255, US 2013/0071114 and US 2013/0071115 patent documents.

Moreover, a depressed trench-assisted optical fiber leads to decrease the macrobending losses by improving the confinement of the optical modes within the core. Thus, adding a trench in the cladding of a few-mode fiber, which satisfies the criteria $R_1 \geq 13.5$ μm and C<18, allows to significantly improve the trade-off between DMGD and bend losses, such a trench being a well-known way to reduce the bending sensitivity.

Preferably, said optical core radius $R_1$ is such that $R_1 \leq 20$ μm.

According to one advantageous characteristic, said trench has parameters satisfying the following relationship: $55 \leq 1000 \cdot |(R_3 - R_2) \cdot Dn_3 \cdot (R_1^2 \cdot Dn_1)| \leq 150$ where $Dn_3 = n_{trench} - n_{Cl}$ is the trench-cladding index difference at $\lambda = \lambda_C$, where $\lambda_c$ is a central transmission wavelength of an operating band for which said optical fiber is intended.

Preferably, $Dn_3 \leq -3 \cdot 10^{-3}$.

A trench having such features provides a few-mode fiber showing a good trade-off between bend losses and leakage losses. A few-mode fiber according to the invention supports an increased number of LP modes as compared to prior art FMFs, while ensuring low DMGDs, and shows low bend losses (<100 dB/turn at 10 mm bend radius at 1550 nm) for all guided modes, so that they can robustly propagate, and high leakage losses (>0.1 dB/m at 1550 nm) for all the leaky modes, so that they can be cut-off and/or highly attenuated after few tens of meters.

According to an embodiment of the invention, such an optical fiber guides at least 4 LP modes, and preferably 4 to 16 LP modes.

According to another embodiment of the invention, such an optical fiber guides at least 6 LP modes, and preferably 6 to 16 LP modes.

Such a high number of guided modes allow increasing the capacity of an optical system comprising such a few-mode optical fiber, and answers the demand for higher bandwidth in long-haul optical transmission systems.

A few-mode fiber according to an embodiment of the invention thus guides an increased number of LP modes that can efficiently be used in space-division multiplexed transmissions, as compared to prior art FMFs.

According to a first embodiment, said optical core has a minimal refractive index $n_1 = n_{Cl}$, and said optical cladding also comprises an inner cladding layer directly surrounding said optical core, with an inner radius $R_1$ and an outer radius $R_2 \geq R_1$, said inner cladding layer having a constant refractive index $n_2$, such that $n_2 \neq n_{Cl}$ and $n_2 > n_{trench}$.

Such a graded-index trench-assisted profile allows meeting the core criterion and the trench criterion set forth in an embodiment of the invention. Moreover, such a few-mode fiber is easy to manufacture and costs little. The inner cladding layer may either have a negative or a positive refractive index difference with the core.

According to a second embodiment, said optical core has a minimal refractive index $n_1 \neq n_{Cl}$, and said optical cladding also comprises an inner cladding layer directly surrounding said optical core, with an inner radius $R_1$ and an outer radius $R_2 \geq R_1$, said inner cladding layer having a constant refractive index $n_2$, such that $n_2 = n_1$ and $n_2 > n_{trench}$.

Such an alternate graded-index trench-assisted profile allows meeting the core criterion and the trench criterion set forth in an embodiment of the invention. Moreover, such a few-mode fiber is easy to manufacture and costs little. The inner cladding layer may either have a negative or a positive refractive index difference with the core.

According to a third embodiment, said optical core has a minimal refractive index that equals $n_{Cl}$, and said optical cladding also comprises an inner cladding layer directly surrounding said optical core, with an inner radius $R_1$ and an outer radius $R_2 \geq R_1$, said inner cladding layer being an extension of said single α graded-index profile of said optical core, and wherein said inner layer has a minimal refractive index $n_1 = n_{trench}$.

Although manufacturing such a few-mode fiber is somehow more difficult, as compared to the first and second embodiments, such a graded-index trench-assisted profile allows better optimizing the α parameter of the graded index profile.

According to an aspect of the invention, such an optical fiber supports four LP guided modes, and is such that Max|DMGDs|<20 ps/km and preferably Max|DMGDs|<10 ps/km at $\lambda = \lambda_C$ (for example $\lambda_c = 1550$ nm), and is such that Max|DMGDs|<30 ps/km and preferably Max|DMGDs|<20 ps/km for $\lambda \in [\lambda_C - \delta\lambda; \lambda_C + \delta\lambda]$, where $\lambda_c$ is a central transmission wavelength of an operating band for which said optical fiber is intended and where $2\delta\lambda$ is a width of said operating band, preferably $\delta\lambda = 20$ nm (for example for $\lambda \in [1530$ nm; $1570$ nm]).

It is noted that the FMFs described herein and throughout the document are suitable for use within, at a minimum, the entire "C-band", but also in some cases the S-, C-, U- and L-bands.

According to another aspect of the invention, such an optical fiber supports six LP guided modes, and is such that Max|DMGDs|<25 ps/km and preferably Max|DMGDs|<15 ps/km at $\lambda = \lambda_C$ (for example $\lambda_c = 1550$ nm), and is such that Max|DMGDs|<50 ps/km and preferably Max|DMGDs|<30 ps/km for $\lambda \in [\lambda_C - \delta\lambda; \lambda_C + \delta\lambda]$, where $\lambda_c$ is a central transmission wavelength of an operating band for which said optical fiber is intended and where $2\delta\lambda$ is a width of said operating band, preferably $\delta\lambda = 20$ nm (for example for $\lambda \in [1530$ nm; $1570$ nm]).

The Differential Mode Group Delays are hence very low on all the extended C-band, while the challenge of increasing the number of LP modes up to six is met.

According to another aspect of the invention, such an optical fiber supports nine LP guided modes, and is such that Max|DMGDs|<100 ps/km and preferably Max|DMGDs|<60 ps/km at $\lambda = \lambda_C$ (for example $\lambda_c = 1550$ nm), and is such that Max|DMGDs|<200 ps/km and preferably Max|DMGDs|<120 ps/km for $\lambda \in [\lambda_C - \delta\lambda; \lambda_C + \delta\lambda]$, where $\lambda_c$ is a central transmission wavelength of an operating band for which said optical fiber is intended and where $2\delta\lambda$ is a width of said operating band, preferably $\delta\lambda = 20$ nm (for example for $\lambda \in [1530$ nm; $1570$ nm]).

The Differential Mode Group Delays are hence quite low on all the extended C-band, (and more generally on any standardized wavelength band: C-band, L-band, U-band, S-band . . . ) while the challenge of increasing the number of LP modes up to nine is met.

According to yet another aspect of the invention, such an optical fiber supports twelve LP guided modes, and is such that Max|DMGDs|<150 ps/km and preferably Max|DMGDs|<120 ps/km at $\lambda = \lambda_C$ (for example $\lambda_c = 1550$ nm), and is such that Max|DMGDs|<300 ps/km and preferably Max|DMGDs|<250 ps/km for $\lambda \in [\lambda_C - \delta\lambda; \lambda_C + \delta\lambda]$, where $\lambda_c$ is a central transmission wavelength of an operating band for which said optical fiber is intended and where $2\delta\lambda$ is a width of said operating band, preferably $\delta\lambda = 20$ nm (for example for $\lambda \in [1530$ nm; $1570$ nm]).

The Differential Mode Group Delays still remain low on all the extended C-band (and more generally on any standardized wavelength band: C-band, L-band, U-band, S-band . . . ), while the challenge of increasing the number of LP modes up to twelve is met, which is a very interesting increase in fiber capacity.

According to yet another aspect of the invention, such an optical fiber supports sixteen LP guided modes, and is such that Max|DMGDs|<300 ps/km and preferably Max|DMGDs|<250 ps/km at $\lambda = \lambda_C$ (for example $\lambda_c = 1550$ nm), and is such that Max|DMGDs|<600 ps/km and preferably Max|DMGDs|<500 ps/km for $\lambda \in [\lambda_C - \delta\lambda; \lambda_C + \delta\lambda]$, where $\lambda_c$ is a central transmission wavelength of an operating band for which said optical fiber is intended and where $2\delta\lambda$ is a width of said operating band, preferably $\delta\lambda = 20$ nm (for example for $\lambda \in [1530$ nm; $1570$ nm]).

The Differential Mode Group Delays are hence low enough on all the extended C-band (and more generally on any standardized wavelength band: C-band, L-band, U-band, S-band . . . ) to ensure a good system reach, while the number of LP modes has been tremendously increased up to sixteen.

According to an advantageous characteristic, LP modes guided by said optical fiber have effective areas, $A_{eff}$<400 µm², preferably $A_{eff}$<350 µm², and bend losses <100 dB/turn, preferably <50 dB/turn, at 10 mm bend radius at 1550 nm, and LP leakage modes have leakage losses >0.1 dB/m, preferably >0.5 dB/m, at $\lambda=\lambda_C$.

Such a few-mode fiber shows a very good trade-off between bend losses and leakage losses. Such relatively large effective areas limit intra-mode non-linearity.

Another aspect of the disclosure concerns an optical link comprising at least one optical fiber as described here above in any of its embodiments.

Such an optical link may comprise any number of concatenated optical fibers, as long as one of them at least complies with the features set forth in the invention. Such an optical link may also comprise several optical fibers, which would all comply with the features of the invention.

Another aspect of the disclosure concerns an optical system comprising at least one optical fiber as described here above in any of its embodiments.

BRIEF DESCRIPTION OF THE FIGURES

Other features and advantages of embodiments of the invention shall appear from the following description, given by way of an indicative and non-exhaustive examples and from the appended drawings, of which.

DETAILED DESCRIPTION

Figure 1:
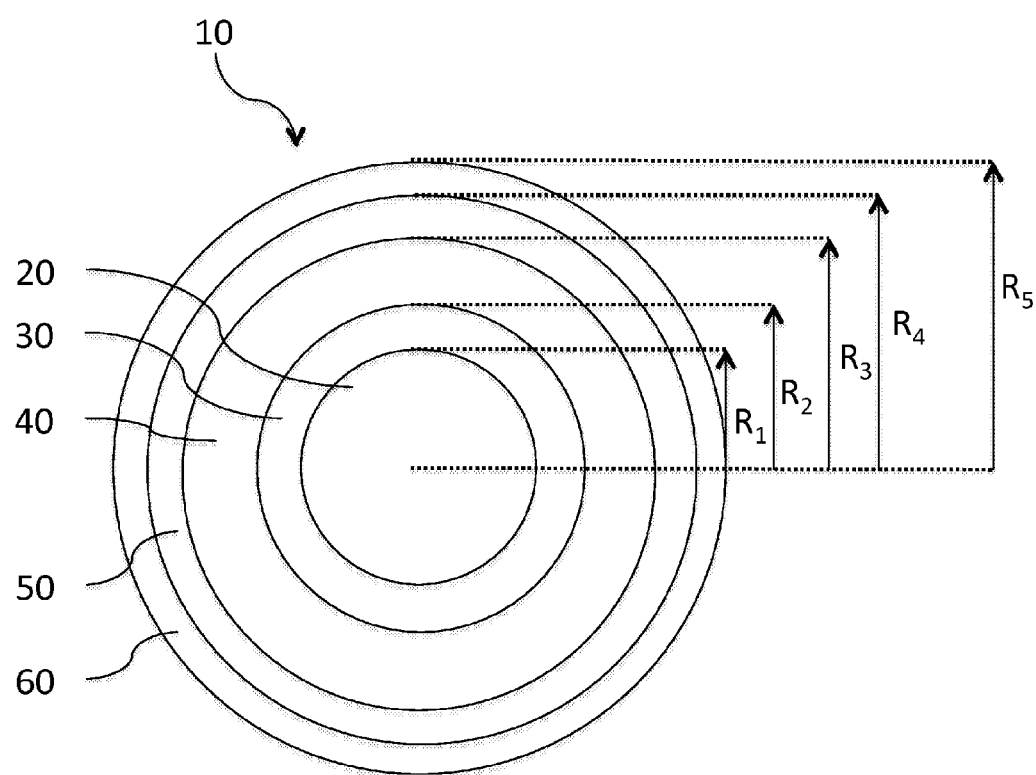
FIG. 1 schematically depicts a cross section of an optical fiber according to one or more embodiments described herein.

The general principle of the invention is to propose a carefully designed trench-assisted graded index few-mode optical fiber, showing reduced Differential Mode Group Delay and supporting more LP modes over prior art FMFs. More precisely, the purpose of such a design is to provide an improved trade-off over prior art FMFs between reduced Differential Mode Group Delay, reduced bend loss and increased leakage loss.

Light travelling in an optical fiber actually forms hybrid-type modes, which are usually referred to as LP (linear polarization) modes. The $LP_{0p}$ modes have tow polarization degrees of freedom and are two-fold degenerate, the $LP_{mp}$ modes with m≥1 are four-fold degenerate. These degeneracies are not counted when designating the number of LP modes propagating in the fiber. Hence, a few-mode optical fiber having two LP modes supports the propagation of all of the $LP_{01}$ and $LP_{11}$ modes, or a few-mode fiber guiding 6 LP modes supports the propagation of all of the $LP_{01}$, $LP_{11}$, $LP_{02}$, $LP_{21}$, $LP_{12}$ and $LP_{31}$ modes.

Reference will now be made in detail to embodiments of few-mode optical fibers, examples of which are illustrated in the accompanying drawings. Whenever possible, the same reference numerals will be used throughout the drawings to refer to the same or like parts.

One embodiment of a few-mode optical fiber according to the invention is schematically depicted in cross section in FIG. 1. The optical fiber 10 generally has a glass core 20 surrounded by a glass cladding. The glass core 20 generally has a radius $R_1$ from about 13.5 µm to about 20 µm. The cladding generally has an inner radius $R_1$ and an outer radius $R_4$. In the embodiments shown and described herein, the core 20 and the cladding generally comprise silica, specifically silica glass. The cross-section of the optical fiber 10 may be generally circular-symmetric with respect to the center of the core 20. In some embodiments described herein, the radius $R_4$ (i.e. the radius of the glass portion of the optical fiber 10) is about 62.5 µm. However, it should be understood that the dimensions of the cladding may be adjusted such that the radius $R_4$ may be greater than or less than 62.5 µm. The optical fiber 10 also comprises a coating 60 of inner radius $R_4$ and of outer radius $R_5$. Such a coating may comprise several layers, and it may notably be a dual-layer coating, although these different layers are not shown on FIG. 1. It must be noted that $R_4$ and $R_5$ are the lower and upper limits of the coating, whatever the number of layers in-between. In some embodiments described herein, the radius $R_5$ is about 122.5 µm (but it could be greater or less than 122.5 µm). In alternative embodiments, other dimensions could be such that $R_4$=40 µm or $R_4$=50 µm, and $R_5$=62.5 µm.

Figure 2A:
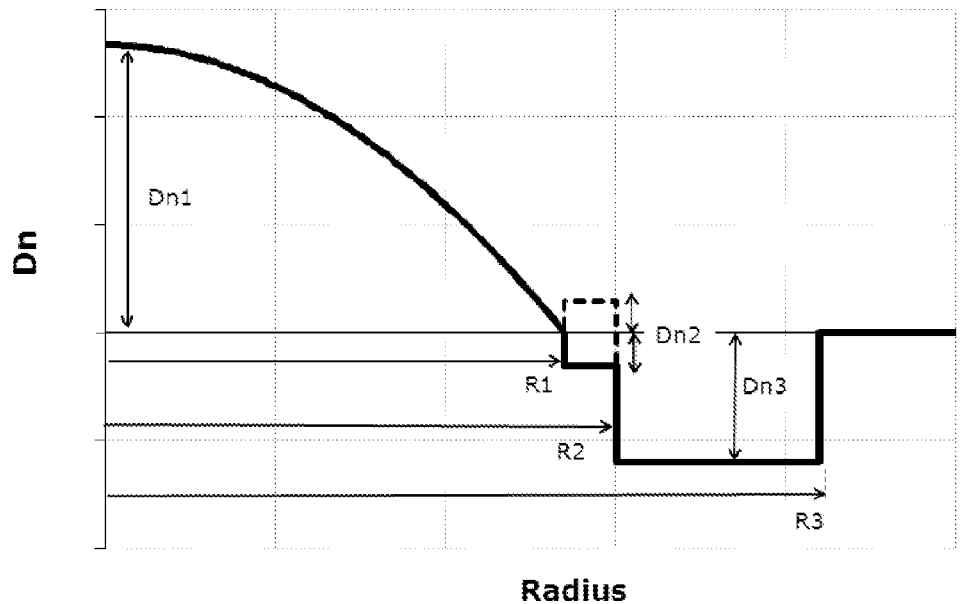
FIG. 2A graphically provides the refractive index profile of an optical fiber according to a first embodiment of the invention.

FIG. 2A depicts the refractive index profile n(r) of optical fiber 10 according to a first embodiment of the invention. It describes the relationship between the refractive index value n and the distance r from the center of the optical fiber. The x-axis represents radial position with x=0 representing the center of the core region, and the y-axis represents refractive index, expressed as an index difference Dn unless otherwise stated.

In that first embodiment, the optical fiber 10 has an optical core 20 having a refractive index profile n(r) defined as follows:

$$n(r) = n_0 \cdot \sqrt{1 - 2 \cdot \Delta \cdot \left(\frac{r}{R_1}\right)^\alpha} \quad r \leq R_1$$

where:
r is a variable representative of the radius of the optical fiber,
$R_1$ is the optical core radius, Δ is the normalized refractive index difference, with $$\Delta = \frac{n_0^2 - n_1^2}{2n_0^2}$$

$n_1$ is the minimal refractive index of the optical core,
$n_0$ is the maximal refractive index of the optical core,
α is a non-dimensional parameter that defines the index profile shape of the optical core.

The alpha refractive index profile of the optical core 20 allows reducing intermodal dispersion of the optical fiber 10.

The optical core 20 is directly surrounded by an optical cladding, which comprises at least a depressed-index ring 40, also called a trench, with inner radius $R_2$ and outer radius $R_3$, and an outer cladding layer 50 with inner radius $R_3$. In some embodiments such an outer cladding layer 50 comprises pure silica glass ($SiO_2$) and its refractive index $n_{Cl}$ is hence that of silica glass. This trench 40 has a negative refractive index difference $Dn_3=n_{trench}-n_{Cl}$ with respect to the refractive index of the outer cladding, and its position and size are designed so as to improve bend-loss resistance of the fiber.

Preferably, the trench 40 is designed so as to fulfill the following criterion:

$$55 \leq 1000 \cdot |(R_3-R_2) \cdot Dn_3 \cdot (R_1^2 \cdot Dn_1)| \leq 150$$

where $Dn_3=n_{trench}-n_{Cl}$ is the trench-cladding index difference at $\lambda=\lambda_C$, where $\lambda_C$ is the central wavelength of any operating band for which the optical fiber is intended.
Such a criterion allows reaching a good trade-off between bend losses and leakage losses in the fiber.

The cladding may also optionally include an inner cladding layer 30, with inner radius $R_1$ and outer radius $R_2$. The trench 40 may hence be spaced apart from the core 20 by the inner cladding layer 30. Alternatively, the trench 40 may surround and directly contact the core portion 20.

In this first embodiment, the inner cladding 30 has a constant refractive index $n_2$, such that $n_2>n_{trench}$, and which may either show a negative or a positive (shown in dashed lines on FIG. 2A) refractive index difference $Dn_2=n_2-n_{Cl}$ with respect to the optical fiber outer cladding.

The different portions 30, 40, 50 in the cladding may comprise pure silica glass ($SiO_2$), silica glass with one or more dopants, which increase the index of refraction (e.g. $GeO_2$ or any other known dopant), such as when the portion of the cladding is "up-doped", or silica glass with a dopant, which decreases the index of refraction, such as fluorine, such as when the portion of the cladding is "down-doped" (e.g. for the trench 40).

Although not illustrated on FIG. 1, the outer cladding 50 may also comprise other portions or layers of lower or higher refractive indexes, for $r>R_3$.

In the first embodiment illustrated by FIG. 2A, the minimal refractive index of the core $n_1$ is equal to the refractive index of the outer cladding $n_{Cl}$.

The down-doped trench 40 can provide lower bending loss.

Figure 2B:
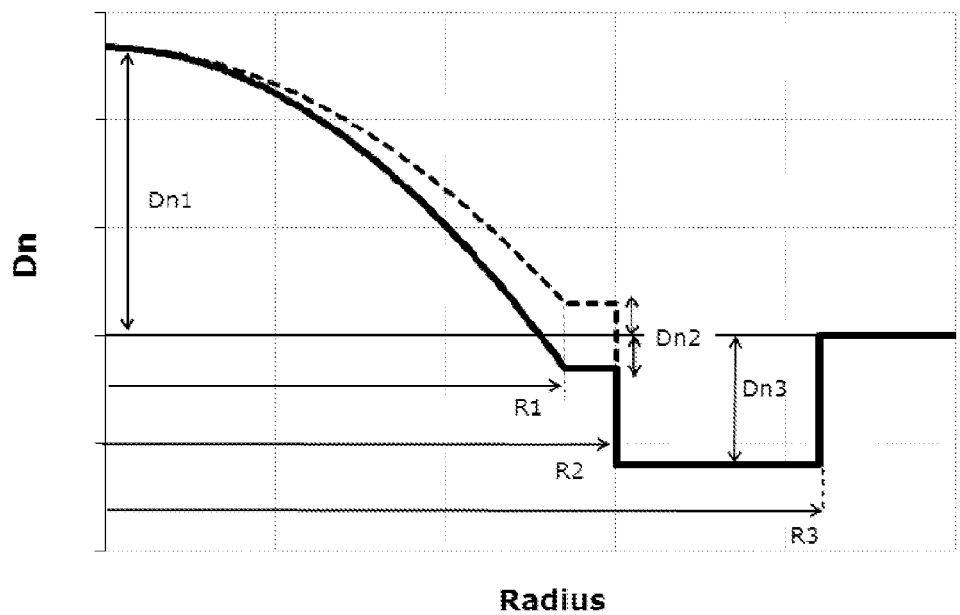
FIG. 2B graphically provides the refractive index profile of an optical fiber according to a second embodiment of the invention.

FIG. 2B depicts the refractive index profile n(r) of an optical fiber according to a second embodiment of the invention. Such a profile differs from that of the first embodiment in that the minimal refractive index of the core $n_1$ is not equal to the refractive index of the outer cladding $n_{Cl}$ but may either show a negative or a positive (shown in dashed lines on FIG. 2B) refractive index difference with respect to the optical fiber outer cladding. In case the cladding comprises an inner cladding layer 30, the minimal refractive index of the core $n_1$ is equal to the constant refractive index of the inner cladding $n_2$, which may either show a negative or a positive (shown in dashed lines on FIG. 2B) refractive index difference $Dn_2=n_2-n_{Cl}$ with respect to the optical fiber outer cladding.

Like in the first embodiment, the outer cladding 50 may also comprise other portions or layers of lower or higher refractive indexes, for $r>R_3$.

Like in the first embodiment, the trench 40 is preferably designed so as to fulfill the following criterion:

$$55 \leq 1000 \cdot |(R_3-R_2) \cdot Dn_3 \cdot (R_1^2 \cdot Dn_1)| \leq 150$$

where $Dn_3=n_{trench}-n_{Cl}$ is the trench-cladding index difference at $\lambda=\lambda_C$, where $\lambda_C$ is the central wavelength of any operating band for which the optical fiber is intended.

Figure 2C:
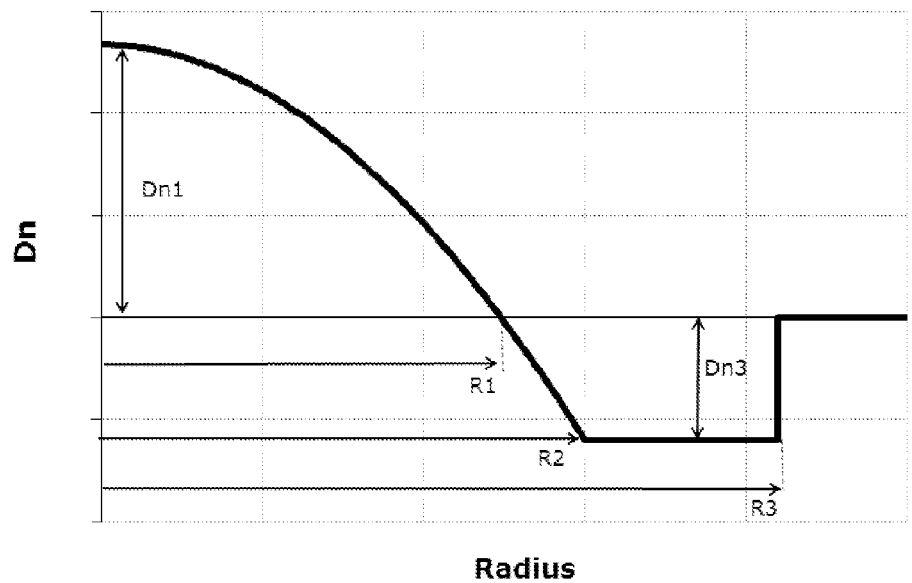
FIG. 2C graphically provides the refractive index profile of an optical fiber according to a third embodiment of the invention.

FIG. 2C depicts the refractive index profile n(r) of an optical fiber according to a third embodiment of the invention.

In this third embodiment, the inner cladding layer 30 is an extension of the graded index core 20, such that both the optical core 20 and the inner cladding layer 30 have a refractive index profile n(r) defined as follows:

$$n(r) = n_0 \cdot \sqrt{1 - 2 \cdot \Delta \cdot \left(\frac{r}{R_2}\right)^\alpha} \quad r \leq R_2$$

where:
r is a variable representative of the radius of the optical fiber,
$R_2$ is the outer radius of the inner cladding layer 30,
Δ is the normalized refractive index difference, with $$\Delta = \frac{n_0^2 - n_1^2}{2n_0^2}$$

$n_1$ is the minimal refractive index of the inner cladding layer (i.e. the refractive index at radius $R_2$),
$n_0$ is the maximal refractive index of the optical core,
α is a non-dimensional parameter that defines the index profile shape of both the optical core and the inner cladding layer.

Hence, in this third embodiment, the term "single-α graded-index profile" has a slightly different meaning as compared to the first two embodiments, since this graded-index profile goes beyond the optical core until the outer edge of the inner cladding layer.

The optical cladding also comprises at least a depressed-index ring 40, with inner radius $R_2$ and outer radius $R_3$, and an outer cladding layer 50 with inner radius $R_3$. In some embodiments such an outer cladding layer 50 comprises pure silica glass ($SiO_2$) and its refractive index $n_{Cl}$ is hence that of silica glass. The trench 40 has a negative refractive index difference $Dn_3=n_{trench}-n_{Cl}$ with respect to the refractive index of the outer cladding, and its position and size are designed so as to improve bend-loss resistance of the fiber.

Like in the first and second embodiments, the outer cladding 50 may also comprise other portions or layers of lower or higher refractive indexes, for $r>R_3$.

Like in the first and second embodiments, the trench 40 is preferably designed so as to fulfill the following criterion:

$$55 \leq 1000 \cdot |(R_3-R_2) \cdot Dn_3 \cdot (R_1^2 \cdot Dn_1)| 150$$

where $Dn_3 = n_{trench} - n_{Cl}$ is the trench-cladding index difference at $\lambda = \lambda_C$, where $\lambda_C$ is the central wavelength of any operating band for which the optical fiber is intended.

Figure 3:
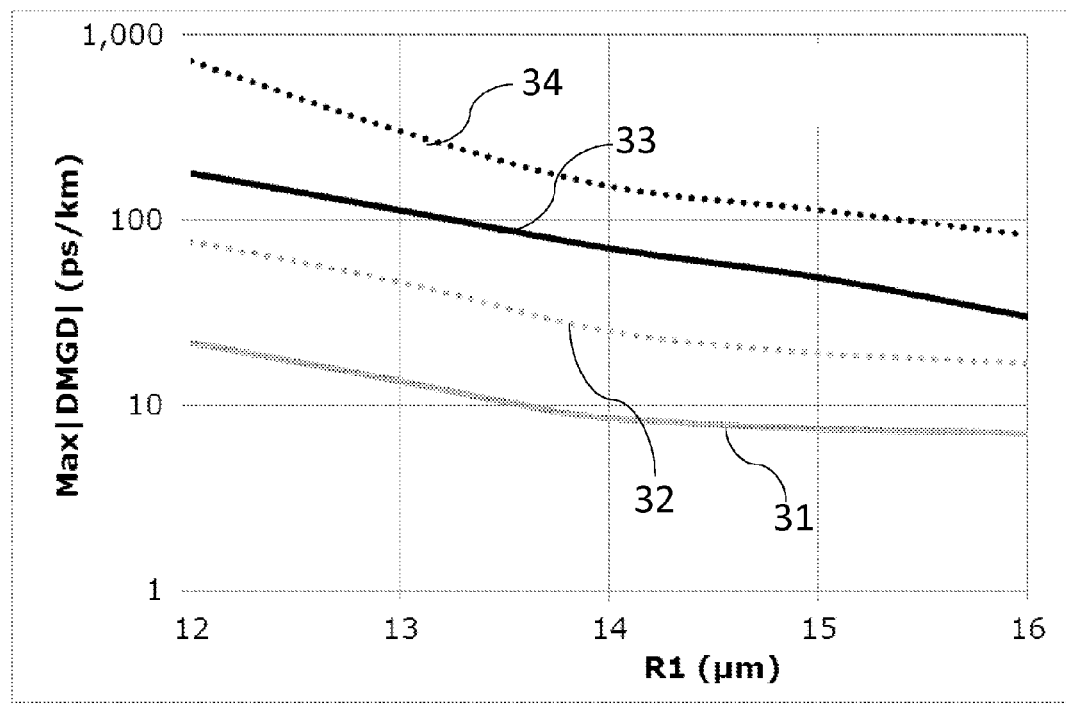
FIG. 3 illustrates how Differential Mode Group Delays decrease as a function of $R_1$ for few-mode fibers supporting 6 to 16 LP guided modes for graded-index trench-assisted structures in accordance with the invention.

FIG. 3 illustrates how the maximum of the Differential Mode Group Delays Max|DMGD| between any two LP modes guided in the optic fiber decreases as a function of the core radius $R_1$ for FMFs guiding 6, 9, 12 and 16 modes according to one of the embodiments of FIGS. 2A-2C. The x-axis depicts the core radius of the fiber $R_1$, ranging from 12 to 16 μm. The y-axis depicts the Max|DMGD| expressed as ps/km on a logarithmic scale. Curve 31 corresponds to a FMF guiding 6 LP modes; curve 32 corresponds to a FMF guiding 9 LP modes; curve 33 corresponds to a FMF guiding 12 LP modes, while curve 34 corresponds to a FMF guiding 16 LP modes.

Figure 4:
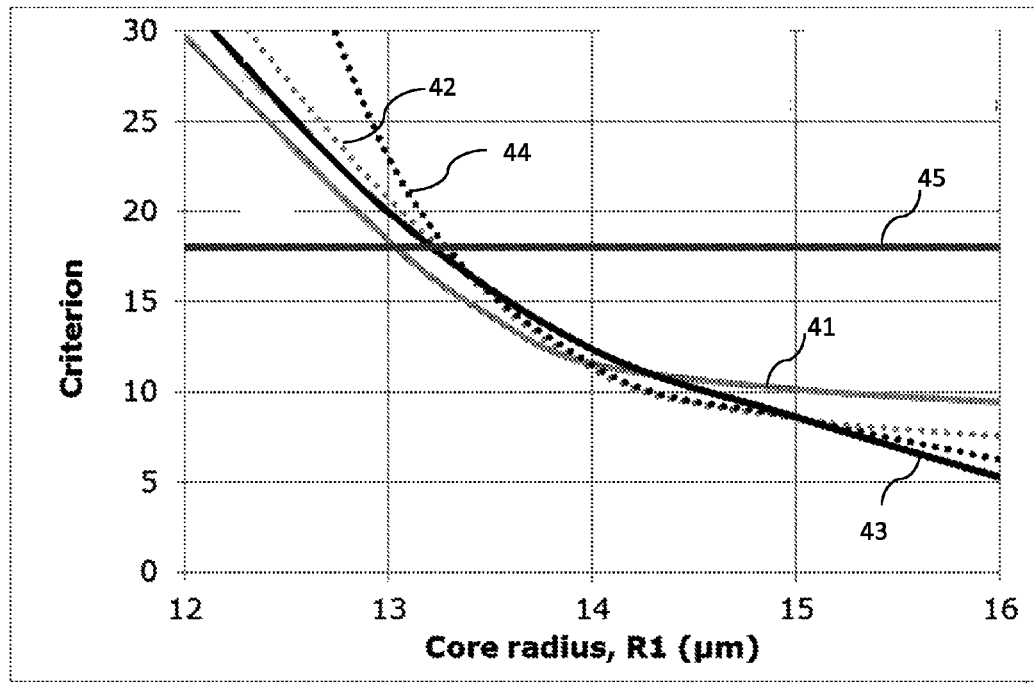
FIG. 4 shows the C criterion set forth in the invention for few-mode fibers supporting 6 to 16 LP guided modes as a function of $R_1$ for graded-index trench-assisted structures in accordance with the invention.

FIG. 4 jointly illustrates how the criterion $$C = 10 \cdot \frac{\text{Max}|DMGDs|}{(R_1^2 \cdot Dn_1)^3},$$

where DMGD is the Differential Mode Group Delay between two guided modes in said optical fiber and where $Dn_1 = n_0 - n_{Cl}$ is the core-cladding index difference at $\lambda = \lambda_C$, where $\lambda_C$ is the central wavelength of any operating band for which the optical fiber is intended, also decreases as a function of the core radius $R_1$ for FMFs guiding 6, 9, 12 and 16 modes according to one of the embodiments of FIGS. 2A-2C. The x-axis depicts the core radius of the fiber $R_1$, ranging from 12 to 16 μm. The y-axis depicts the C criterion ranging from 0 to 30. Curve 41 corresponds to a FMF guiding 6 LP modes; curve 42 corresponds to a FMF guiding 9 LP modes; curve 43 corresponds to a FMF guiding 12 LP modes, while curve 44 corresponds to a FMF guiding 16 LP modes.

As can be observed from both figures, a good trade-off may be obtained by setting the core radius $R_1 \geq 13.5$ μm. This allows reaching low values for Max|DMGD|, whatever the number of LP guided modes in the fiber. By setting the lower limit of the core radius at 13.5 μm, it is possible to guide a high number of LP modes in the FMF, and thus reach a good per-fiber capacity, while, thanks to low Max|DMGD| values, bridge long distances.

Once the core radius has been set at a minimum value of 13.5 μm, it can be deduced from FIG. 4 that an adequate upper limit for the C criterion can be set at a value of 18: C<18. Such an upper limit allowable for FMFs of the invention is illustrated by horizontal straight line 45 on FIG. 4.

As can be observed from FIGS. 3 and 4, for FMFs supporting 6 LP guided modes, the normalized frequency $$V = \frac{2\pi R_1}{\lambda} \sqrt{n_0^2 - n_{Cl}^2},$$

where λ is the operating wavelength) is preferably between 7.8 and 9.8. Max|DMGD| is preferably <25 ps/km, and more preferably <15 ps/km, at λ, here 1550 nm (and more generally at $\lambda = \lambda_C$, where $\lambda_C$ is the central wavelength of any operating band for which the optical fiber is intended). Max|DMGD| is also preferably <50 ps/km and more preferably <30 ps/km from 1530 to 1570 nm (and more generally for any operating wavelength band [$\lambda_C - \delta\lambda; \lambda_C + \delta\lambda$] where $2\delta\lambda$ is a width of said operating band, preferably $\delta\lambda = 20$ nm, such as the C-band, or the L-, S-, or U-band for example).

For FMFs supporting 9 LP guided modes, V is preferably between 9.8 and 11.8. Max|DMGD| is preferably <100 ps/km, and more preferably <60 ps/km, at λ, here 1550 nm (and more generally at $\lambda = \lambda_C$, where $\lambda_C$ is the central wavelength of any operating band for which the optical fiber is intended). Max|DMGD| is also preferably <200 ps/km and more preferably <120 ps/km from 1530 to 1570 nm (and more generally for any operating wavelength band [$\lambda_C - \delta\lambda; \lambda_C + \delta\lambda$] where $2\delta\lambda$ is a width of said operating band, preferably $\delta\lambda = 20$ nm, such as the C-band, or the L-, S-, or U-band for example).

For FMFs supporting 12 LP guided modes, V is preferably between 11.8 and 13.8. Max|DMGD| is preferably <150 ps/km and more preferably <120 ps/km, at λ, here 1550 nm (and more generally at $\lambda = \lambda_C$, where $\lambda_C$ is the central wavelength of any operating band for which the optical fiber is intended). Max|DMGD| is also preferably <300 ps/km and more preferably <250 ps/km from 1530 to 1570 nm (and more generally for any operating wavelength band [$\lambda_C - \delta\lambda; \lambda_C + \delta\lambda$] where $2\delta\lambda$ is a width of said operating band, preferably $\delta\lambda = 20$ nm, such as the C-band, or the L-, S-, or U-band for example).

For FMFs supporting 16 LP guided modes, V is preferably between 13.8 and 15.9. Max|DMGD| is preferably <300 ps/km and more preferably <250 ps/km, at λ, here 1550 nm (and more generally at $\lambda = \lambda_C$, where $\lambda_C$ is the central wavelength of any operating band for which the optical fiber is intended). Max|DMGD| is also preferably <600 ps/km and more preferably <500 ps/km from 1530 to 1570 nm (and more generally for any operating wavelength band [$\lambda_C - \delta\lambda; \lambda_C + \delta\lambda$] where $2\delta\lambda$ is a width of said operating band, preferably $\delta\lambda = 20$ nm, such as the C-band, or the L-, S-, or U-band for example).

Moreover, for FMFs supporting 4 LP guided modes, the normalized frequency V is preferably between 5.7 and 7.8. Max|DMGD| is preferably <20 ps/km, and more preferably <10 ps/km, at 1550 nm (and more generally at $\lambda = \lambda_C$, where $\lambda_C$ is the central wavelength of any operating band for which the optical fiber is intended). Max|DMGD| is also preferably <30 ps/km and more preferably <20 ps/km from 1530 to 1570 nm (and more generally for any operating wavelength band [$\lambda_C - \delta\lambda; \lambda_C + \delta\lambda$] where $2\delta\lambda$ is a width of said operating band, preferably $\delta\lambda = 20$ nm, such as the C-band, or the L-, S-, or U-band for example).

All LP guided modes of FMFs according to an embodiment of the invention have effective areas, $A_{eff} < 400$ μm², preferably <350 μm², and bend losses <100 dB/turn, preferably <50 dB/turn, at 10 mm bend radius at 1550 nm, and all LP leakage modes have leakage losses >0.1 dB/m, preferably >0.5 dB/m, at 1550 nm, so that they are cut-off after few tens of meters of propagation (>19.34 dB (Leakage loss)) (and more generally at $\lambda = \lambda_C$, where $\lambda_C$ is the central wavelength of any operating band for which the optical fiber is intended). As used herein, the effective area of an optical fiber is the area of the optical fiber in which light is propagated and is determined at the specified mode (e.g. $LP_{01}$), at a wavelength of 1550 nm, unless otherwise specified.

Although not illustrated by FIGS. 3 and 4, for FMFs supporting 4 LP guided modes, V is preferably between 5.7 and 7.8. Max|DMGD| is preferably <20 ps/km, and more preferably <10 ps/km, at λ, here 1550 nm (and more generally at $\lambda = \lambda_C$, where $\lambda_C$ is the central wavelength of any operating band for which the optical fiber is intended).

Max|DMGD| is also preferably <30 ps/km and more preferably <20 ps/km from 1530 to 1570 nm (and more generally for any operating wavelength band [$\lambda_C$ $\delta\lambda$; $\lambda_C+\delta\lambda$] where $2\delta\lambda$ is a width of said operating band, preferably $\delta\lambda$=20 nm, such as the C-band, or the L-, S-, or U-band for example).

Table 1 gives the parameters of the index profiles of examples of FMFs according to the embodiment of FIG. 2B, and results on Max|DMGD|, specific core Criterion C and trench criterion T.

Losses, expressed as dB/turn, are given at 10 mm bend radius. $A_{eff}$ expressed as $\mu m^2$ designates the effective area of the LP guided mode. The Differential Mode Group Delay DMGD is measured with respect to the first guided mode $LP_{01}$ and expressed as ps/km. $LP_{12}$ and $LP_{31}$ are leaky modes.

Table 3 gives the characteristics of the LP modes of the Examples of Table 1 supporting 6 LP guided modes, that is to say Examples 1, 2 and 3, at a wavelength $\lambda$=1550 nm.

TABLE 1

|  | Ex. 0 | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| # Guided LP modes | 4 | | 6 | | | 9 | | 12 | | 16 | |
| Alpha | 1.9581 | 1.949 | 1.951 | 1.954 | 1.944 | 1.945 | 1.934 | 1.934 | 1.926 | 1.928 | 1.931 |
| R1 (μm) | 14.00 | 13.50 | 14.00 | 15.00 | 14.00 | 15.00 | 14.00 | 15.00 | 14.00 | 15.00 | 16.00 |
| Dn1 (×10³ at 1550 nm) | 6.31 | 10.69 | 9.95 | 8.66 | 14.4 | 12.55 | 19.65 | 17.13 | 26.02 | 22.7 | 19.06 |
| R2 (μm) | 15.88 | 14.66 | 15.30 | 16.56 | 15.05 | 16.12 | 14.91 | 15.44 | 14.68 | 15.98 | 16.63 |
| Dn2 (×10³ at 1550 nm) | 0 | 0 | 0 | 0 | 0.12 | 0 | −0.59 | 0 | −0.89 | −1.06 | 0.2 |
| R3 (μm) | 22.23 | 20.53 | 21.42 | 23.18 | 19.57 | 22.56 | 19.39 | 19.30 | 19.08 | 20.77 | 20.41 |
| Dn3 (×10³ at 1550 nm) | −4.81 | −4.81 | −4.81 | −4.81 | −5.78 | −4.81 | −5.78 | −3.85 | −5.78 | −5.78 | −4.81 |
| Max|DMGD| (ps/km) | 2.9 | 11.3 | 8.6 | 8.0 | 25.4 | 21.2 | 73.5 | 87.3 | 152.7 | 124.1 | 96.1 |
| Core Criterion | 15.3 | 15.3 | 11.6 | 10.8 | 11.3 | 9.4 | 12.9 | 15.2 | 11.5 | 9.3 | 8.3 |
| Trench Criterion | 37.8 | 55.0 | 57.4 | 62.1 | 73.7 | 87.6 | 99.6 | 57.3 | 129.8 | 141.5 | 88.7 |

In table 1, the core criterion is the C parameter such that $$C = 10 \cdot \frac{\text{Max}|DMGDs|}{(R_1^2 \cdot Dn_1)^3}.$$

The trench criterion T is defined as T=1000·(R$_3$−R$_2$)·Dn$_3$·(R$_1^2$·Dn$_1$)|. According to a preferred embodiment 55≤T≤150. As can be noticed, for Example 0 of a FMF guiding 4 LP modes, the T criterion is not met, since T=37.8, although the C criterion is met with C=15.3<18. However, with such a "low" number of LP modes (i.e. 4), the trade-off between the bend losses and the leakage losses is much more easily met.

Table 2 gives the characteristics of the LP modes of the Examples of Table 1 supporting 4 LP guided modes, i.e. modes $LP_{01}$, $LP_{11}$, $LP_{21}$ and $LP_{02}$

TABLE 2

| Ex. 0 | Dneff (×10⁻³) | Leakage Loss (dB/m) | $A_{eff}$ (μm²) | CD (ps/nm-km) | Bend Loss (dB/turn) | DMGD vs. LP01 (ps/km) |
|---|---|---|---|---|---|---|
| LP01 | 4.68 | / | 158 | 20.7 | 0.0 | / |
| LP11 | 3.01 | / | 213 | 20.9 | 0.0 | −2.4 |
| LP21 | 1.36 | / | 286 | 21.2 | 1.5 | 0.5 |
| LP02 | 1.37 | / | 323 | 21.3 | 4.8 | −1.5 |
| LP12 | <0 | 13.7 | | | | |
| LP31 | <0 | 2.4 | | | | |

In table 2, as well as in tables 3 to 6 disclosed below, Dneff stands for the effective index difference, CD stands for the chromatic dispersion expressed as ps/nm-km (chromatic dispersion is the sum of the material dispersion, the waveguide dispersion and the inter-modal dispersion), and Bend

TABLE 3

| | Dneff (×10⁻³) | Leakage Loss (dB/m) | $A_{eff}$ (μm²) | CD (ps/nm-km) | Bend Loss (dB/turn) | DMGD vs. LP01 (ps/km) |
|---|---|---|---|---|---|---|
| Ex. 1 | | | | | | |
| LP01 | 8.50 | / | 117 | 20.0 | 0.0 | / |
| LP11 | 6.25 | / | 157 | 20.3 | 0.0 | −10.3 |
| LP21 | 4.01 | / | 211 | 20.5 | 0.0 | −8.5 |
| LP02 | 4.02 | / | 238 | 20.5 | 0.0 | −8.0 |
| LP12 | 1.79 | / | 254 | 20.7 | 6.5 | −7.6 |
| LP31 | 1.77 | / | 254 | 20.8 | 1.3 | 1.0 |
| LP03 | <0 | 53.4 | | | | |
| LP22 | <0 | 33.5 | | | | |
| LP41 | <0 | 3.0 | | | | |
| Ex. 2 | | | | | | |
| LP01 | 7.71 | / | 126 | 20.1 | 0.0 | / |
| LP11 | 5.62 | / | 169 | 20.4 | 0.0 | −7.6 |
| LP21 | 3.54 | / | 227 | 20.6 | 0.0 | −6.5 |
| LP02 | 3.55 | / | 256 | 20.6 | 0.0 | −7.8 |
| LP12 | 1.48 | / | 274 | 20.9 | 7.3 | −7.5 |
| LP31 | 1.46 | / | 273 | 20.9 | 1.6 | 0.8 |
| LP03 | <0 | 37.8 | | | | |
| LP22 | <0 | 21.4 | | | | |
| LP41 | <0 | 1.8 | | | | |
| Ex. 3 | | | | | | |
| LP01 | 6.70 | / | 144 | 20.3 | 0.0 | / |
| LP11 | 4.87 | / | 194 | 20.5 | 0.0 | −4.4 |
| LP21 | 3.06 | / | 260 | 20.7 | 0.0 | −4.3 |
| LP02 | 3.07 | / | 294 | 20.7 | 0.1 | −7.5 |
| LP12 | 1.27 | / | 314 | 21.1 | 7.6 | −5.2 |
| LP31 | 1.25 | / | 313 | 21.0 | 2.0 | 0.5 |
| LP03 | <0 | 17.4 | | | | |
| LP22 | <0 | 9.9 | | | | |
| LP41 | <0 | 0.9 | | | | |

$LP_{03}$, $LP_{22}$ and $LP_{41}$ are leaky modes.

Table 4 gives the characteristics of the LP modes of the Examples of Table 1 supporting 9 LP guided modes, that is to say Examples 4 and 5, at a wavelength $\lambda$=1550 nm. As can be observed, $LP_{13}$, $LP_{32}$ and $LP_{51}$ are leaky modes.

TABLE 4

| Ex. 4 | Dneff (×10⁻³) | Leakage Loss (dB/m) | $A_{eff}$ (μm²) | CD (ps/nm-km) | Bend Loss (dB/turn) | DMGD vs. LP01 (ps/km) |
|---|---|---|---|---|---|---|
| LP01 | 11.75 | / | 104 | 19.3 | 0.0 | / |
| LP11 | 9.23 | / | 140 | 19.6 | 0.0 | −22.5 |
| LP21 | 6.72 | / | 188 | 20.0 | 0.0 | −25.1 |
| LP02 | 6.74 | / | 212 | 19.9 | 0.0 | −20.1 |
| LP12 | 4.24 | / | 227 | 20.3 | 0.0 | −24.3 |
| LP31 | 4.22 | / | 226 | 20.3 | 0.0 | −16.7 |
| LP03 | 1.76 | / | 311 | 20.4 | 12.0 | −16.1 |
| LP22 | 1.75 | / | 284 | 20.5 | 5.4 | −17.8 |
| LP41 | 1.72 | / | 260 | 20.6 | 1.0 | 0.3 |
| LP13 | <0 | 137.1 | | | | |
| LP32 | <0 | 47.4 | | | | |
| LP51 | <0 | 1.6 | | | | |
| Ex. 5 | | | | | | |
| LP01 | 10.41 | / | 119 | 19.6 | 0.0 | / |
| LP11 | 8.21 | / | 161 | 19.9 | 0.0 | −18.5 |
| LP21 | 6.03 | / | 215 | 20.2 | 0.0 | −21.2 |
| LP02 | 6.04 | / | 243 | 20.2 | 0.0 | −16.6 |
| LP12 | 3.87 | / | 260 | 20.4 | 0.0 | −21.1 |
| LP31 | 3.85 | / | 260 | 20.4 | 0.0 | −15.4 |
| LP03 | 1.71 | / | 357 | 20.6 | 9.8 | −15.6 |
| LP22 | 1.69 | / | 326 | 20.6 | 2.9 | −17.1 |
| LP41 | 1.67 | / | 298 | 20.7 | 0.7 | −3.3 |
| LP13 | <0 | 31.2 | | | | |
| LP32 | <0 | 11.4 | | | | |
| LP51 | <0 | 0.5 | | | | |

TABLE 5

| Ex. 6 | Dneff (×10⁻³) | Leakage Loss (dB/m) | $A_{eff}$ (μm²) | CD (ps/nm-km) | Bend Loss (dB/turn) | DMGD vs. LP01 (ps/km) |
|---|---|---|---|---|---|---|
| LP01 | 16.58 | / | 89 | 18.4 | 0.0 | / |
| LP11 | 13.63 | / | 119 | 18.8 | 0.0 | −53.2 |
| LP21 | 10.69 | / | 160 | 19.1 | 0.0 | −73.5 |
| LP02 | 10.72 | / | 181 | 19.1 | 0.0 | −60.9 |
| LP12 | 7.80 | / | 193 | 19.5 | 0.0 | −64.8 |
| LP31 | 7.77 | / | 193 | 19.5 | 0.0 | −70.6 |
| LP03 | 4.90 | / | 266 | 19.8 | 0.0 | −27.5 |
| LP22 | 4.89 | / | 242 | 19.9 | 0.0 | −38.5 |
| LP41 | 4.85 | / | 221 | 19.9 | 0.0 | −45.3 |
| LP13 | 2.00 | / | 260 | 19.0 | 5.8 | −68.4 |
| LP32 | 1.98 | / | 283 | 19.6 | 2.2 | −31.3 |
| LP51 | 1.94 | / | 247 | 20.2 | 0.2 | −5.8 |
| LP04 | <0 | 218.5 | | | | |
| LP23 | <0 | 149.9 | | | | |
| LP42 | <0 | 31.9 | | | | |
| LP61 | <0 | 0.6 | | | | |
| Ex. 7 | | | | | | |
| LP01 | 14.63 | / | 102 | 18.8 | 0.0 | / |
| LP11 | 12.05 | / | 137 | 19.1 | 0.0 | −48.2 |
| LP21 | 9.49 | / | 184 | 19.5 | 0.0 | −68.6 |
| LP02 | 9.52 | / | 208 | 19.5 | 0.0 | −56.5 |
| LP12 | 6.97 | / | 222 | 19.9 | 0.0 | −52.1 |
| LP31 | 6.94 | / | 222 | 19.8 | 0.0 | −66.4 |
| LP03 | 4.44 | / | 304 | 20.1 | 0.0 | 18.1 |
| LP22 | 4.43 | / | 278 | 20.2 | 0.0 | −2.6 |
| LP41 | 4.40 | / | 254 | 20.2 | 0.0 | −37.0 |
| LP13 | 1.90 | / | 298 | 17.4 | 77.5 | −69.2 |
| LP32 | 1.89 | / | 324 | 19.0 | 20.7 | −3.7 |
| LP51 | 1.86 | / | 283 | 20.3 | 2.8 | 6.7 |
| LP04 | <0 | 1077.0 | | | | |
| LP23 | <0 | 750.2 | | | | |
| LP42 | <0 | 145.0 | | | | |
| LP61 | <0 | 3.0 | | | | |

Table 5 gives the characteristics of the LP modes of the Examples of Table 1 supporting 12 LP guided modes (examples 6 and 7). $LP_{04}$, $LP_{23}$, $LP_{42}$ and $LP_{61}$ are leaky modes.

Table 6 gives the characteristics of the LP modes of the Examples of Table 1 supporting 16 LP guided modes (examples 8, 9 and 10). $LP_{14}$, $LP_{33}$, $LP_{52}$ and $LP_{71}$ are leaky modes

TABLE 6

| Ex. 8 | Dneff (×10⁻³) | Leakage Loss (dB/m) | $A_{eff}$ (μm²) | CD (ps/nm-km) | Bend Loss (dB/turn) | DMGD vs. LP01 (ps/km) |
|---|---|---|---|---|---|---|
| LP01 | 22.50 | / | 76 | 17.2 | 0.0 | / |
| LP11 | 19.10 | / | 103 | 17.6 | 0.0 | −88.8 |
| LP21 | 15.72 | / | 139 | 18.1 | 0.0 | −131.5 |
| LP02 | 15.75 | / | 157 | 18.0 | 0.0 | −112.3 |
| LP12 | 12.39 | / | 168 | 18.5 | 0.0 | −133.6 |
| LP31 | 12.35 | / | 167 | 18.5 | 0.0 | −142.9 |
| LP03 | 9.06 | / | 230 | 19.0 | 0.0 | −83.8 |
| LP22 | 9.04 | / | 210 | 19.0 | 0.0 | −104.8 |
| LP41 | 8.99 | / | 192 | 19.0 | 0.0 | −121.8 |
| LP13 | 5.72 | / | 225 | 19.3 | 0.0 | −34.2 |
| LP32 | 5.69 | / | 245 | 19.5 | 0.0 | −43.8 |
| LP51 | 5.64 | / | 214 | 19.6 | 0.0 | −67.9 |
| LP04 | 2.39 | / | 301 | 16.8 | 6.4 | −106.8 |
| LP23 | 2.37 | / | 272 | 17.5 | 2.2 | −80.2 |
| LP42 | 2.34 | / | 276 | 19.0 | 0.4 | −8.2 |
| LP61 | 2.29 | / | 234 | 19.9 | 0.0 | 9.8 |
| LP14 | <0 | 271.8 | | | | |
| LP33 | <0 | 125.1 | | | | |
| LP52 | <0 | 11.8 | | | | |
| LP71 | <0 | 0.2 | | | | |

| Ex. 9 | Dneff (×10⁻³) | LL (dB/m) | Aeff (μm²) | CD (ps/nm-km) | BL (dB/turn) | DMGD (ps/km) |
|---|---|---|---|---|---|---|
| LP01 | 19.61 | / | 88 | 17.8 | 0.0 | 0 |
| LP11 | 16.65 | / | 119 | 18.2 | 0.0 | −73.7 |

TABLE 6-continued

| | Dneff (×10⁻³) | Leakage Loss (dB/m) | $A_{eff}$ (μm²) | CD (ps/nm-km) | Bend Loss (dB/turn) | DMGD vs. LP01 (ps/km) |
|---|---|---|---|---|---|---|
| LP21 | 13.70 | / | 159 | 18.5 | 0.0 | −110.7 |
| LP02 | 13.73 | / | 180 | 18.5 | 0.0 | −94.6 |
| LP12 | 10.80 | / | 192 | 18.9 | 0.0 | −117.5 |
| LP31 | 10.77 | / | 192 | 18.9 | 0.0 | −124.1 |
| LP03 | 7.89 | / | 264 | 19.4 | 0.0 | −85.1 |
| LP22 | 7.87 | / | 241 | 19.4 | 0.0 | −102.0 |
| LP41 | 7.84 | / | 220 | 19.4 | 0.0 | −113.4 |
| LP13 | 4.98 | / | 258 | 19.6 | 0.0 | −59.7 |
| LP32 | 4.95 | / | 281 | 19.7 | 0.0 | −64.5 |
| LP51 | 4.91 | / | 246 | 19.8 | 0.0 | −78.7 |
| LP04 | 2.07 | / | 345 | 18.1 | 6.5 | −106.0 |
| LP23 | 2.06 | / | 312 | 18.6 | 3.3 | −91.4 |
| LP42 | 2.03 | / | 317 | 19.5 | 0.9 | −42.7 |
| LP61 | 1.99 | / | 269 | 20.1 | 0.1 | −26.8 |
| LP14 | <0 | 123.0 | | | | |
| LP33 | <0 | 57.0 | | | | |
| LP52 | <0 | 5.4 | | | | |
| LP71 | <0 | 0.1 | | | | |

| Ex. 10 | Dneff (×10⁻³) | Leakage Loss (dB/m) | $A_{eff}$ (μm²) | CD (ps/nm-km) | Bend Loss (dB/turn) | DMGD vs. LP01 (ps/km) |
|---|---|---|---|---|---|---|
| LP01 | 16.58 | / | 102 | 18.5 | 0.0 | / |
| LP11 | 14.03 | / | 138 | 18.8 | 0.0 | −51.3 |
| LP21 | 11.50 | / | 186 | 19.1 | 0.0 | −82.6 |
| LP02 | 11.52 | / | 210 | 19.1 | 0.0 | −77.7 |
| LP12 | 9.00 | / | 224 | 19.4 | 0.0 | −90.4 |
| LP31 | 8.97 | / | 224 | 19.4 | 0.0 | −96.1 |
| LP03 | 6.50 | / | 308 | 19.8 | 0.0 | −67.2 |
| LP22 | 6.49 | / | 281 | 19.8 | 0.0 | −75.7 |
| LP41 | 6.46 | / | 257 | 19.8 | 0.0 | −89.8 |
| LP13 | 4.00 | / | 301 | 20.2 | 0.0 | −11.5 |
| LP32 | 3.98 | / | 327 | 28.2 | 0.0 | −29.6 |
| LP51 | 3.94 | / | 286 | 20.2 | 0.0 | −60.6 |
| LP04 | 1.50 | / | 401 | 16.9 | 221.3 | −82.0 |
| LP23 | 1.49 | / | 364 | 17.9 | 73.4 | −48.5 |
| LP42 | 1.46 | / | 368 | 19.6 | 27.1 | 0.0 |
| LP61 | 1.43 | / | 312 | 20.4 | 2.1 | −12.3 |
| LP14 | <0 | 916.3 | | | | |
| LP33 | <0 | 522.3 | | | | |
| LP52 | <0 | 100.4 | | | | |
| LP71 | <0 | 1.9 | | | | |

Figure 5:
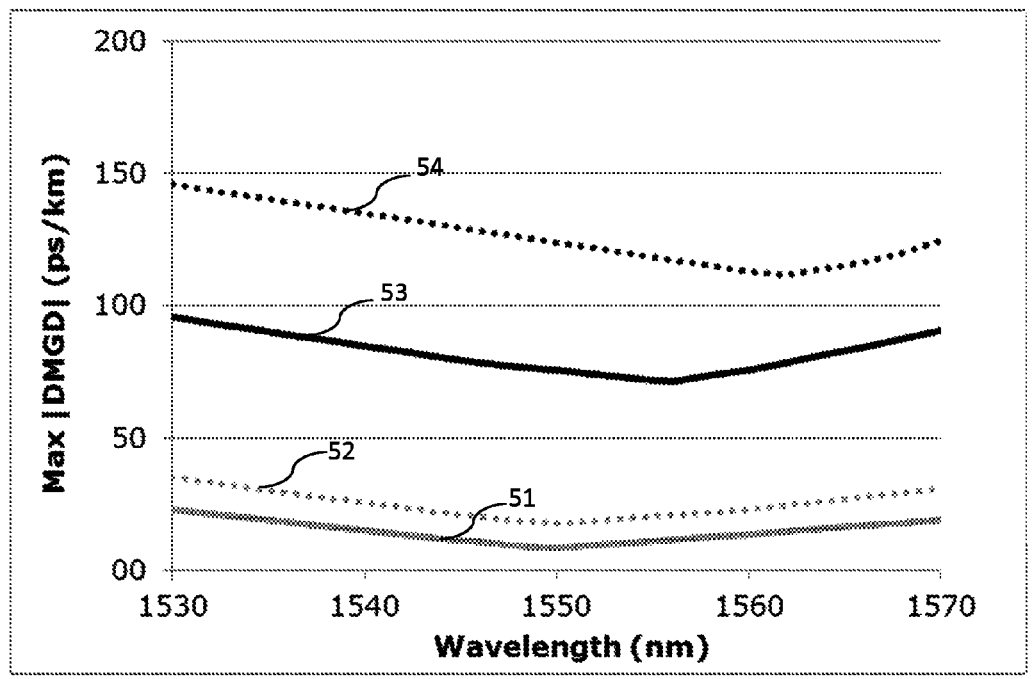
FIG. 5 graphically depicts the Max|DMGD| as a function of wavelength for some embodiments of the invention.

FIG. 5 illustrates the evolution of Max|DMGD| as a function of wavelength for few-mode fibers supporting from 6 to 16 LP guided modes. More precisely, FIG. 5 shows the Max|DMGD| as a function of wavelength for Ex. 2, 5, 6 & 9 listed in Table 1. Such examples correspond to few-mode fiber according to the second embodiment of the invention, as depicted in FIG. 2B.

The x-axis depicts the wavelength of the light guided by the fiber, ranging from 1530 to 1570 nm. The y-axis depicts the Max|DMGD| between any two LP guided modes, expressed as ps/km and ranging from 0 to 200. Curve 51 corresponds to the FMF guiding 6 LP modes of Example 2; curve 52 corresponds to the FMF guiding 9 LP modes of Example 5; curve 53 corresponds to the FMF guiding 12 LP modes of Example 6, while curve 54 corresponds to the FMF guiding 16 LP modes of Example 9.

As can be seen, the Max|DMGD| remains low in the entire extended C-band from 1530 to 1570 nm. The Max|DMGD| slope in this extended C-band is in absolute value <3 ps/km/nm, preferably <2 ps/km/nm, and more preferably <1 ps/km/nm.

Figure 6:
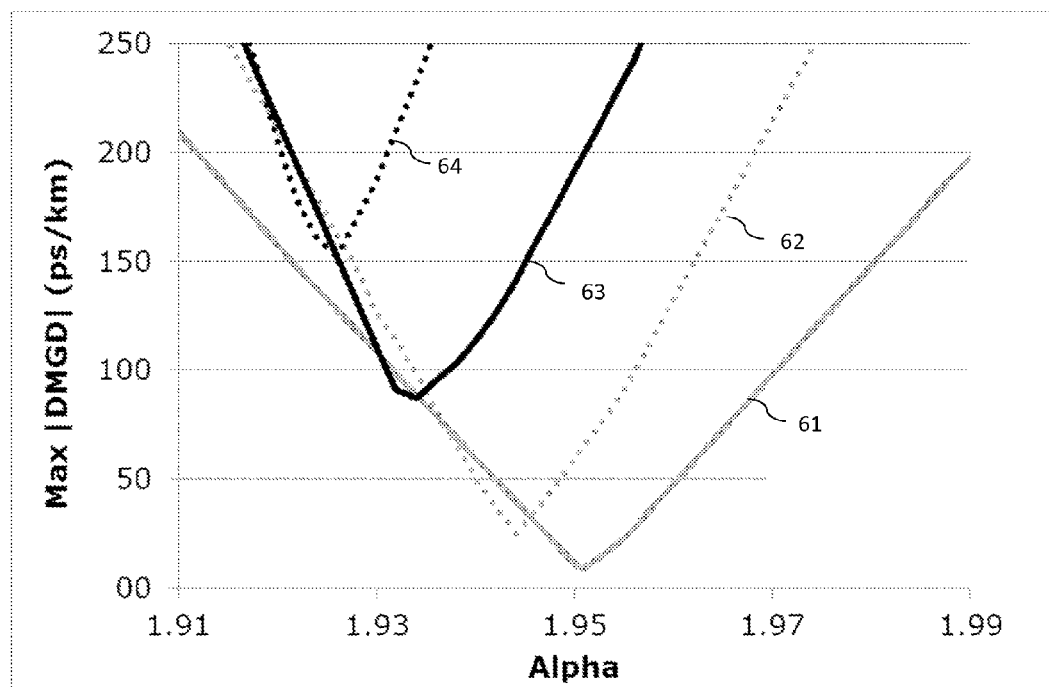
FIG. 6 illustrates the Max|DMGD| as a function of a for some embodiments of the invention.

FIG. 6 depicts the evolution of Max|DMGD| for FMFs supporting from 6 to 16 LP guided modes as a function of the α parameter of the graded-index profile. More precisely, FIG. 6 shows the Max|DMGD| as a function of α for Ex. 2, 4, 7 & 8 listed in Table 1. Such examples correspond to few-mode fiber according to the second embodiment of the invention, as depicted in FIG. 2B.

The x-axis depicts the value of α, which is a non-dimensional parameter that defines the index profile shape of the graded-index optical core, with α ranging from 1.91 to 1.99. The y-axis depicts the Max|DMGD| between any two LP guided modes, expressed as ps/km and ranging from 0 to 200. Curve 61 corresponds to the FMF guiding 6 LP modes of Example 2; curve 62 corresponds to the FMF guiding 9 LP modes of Example 4; curve 63 corresponds to the FMF guiding 12 LP modes of Example 7, while curve 64 corresponds to the FMF guiding 16 LP modes of Example 8.

As shown on FIG. 6, there are optimum values for a, for which these Max|DMGD| have minimum values. α lower and higher than these "optimum α" generally exhibit DMGDs with opposite signs.

By carefully choosing the value of α, as close as possible to the optimum, it is possible to design a few-mode fiber minimizing the Max|DMGD| value. The few mode optical fibers 10 according to the disclosure have a low loss and a small differential group delay, and are suitable for use in optical transmission systems, particularly those that utilize space-division multiplexing and that are configured for long-haul transmission.

Figure 7:
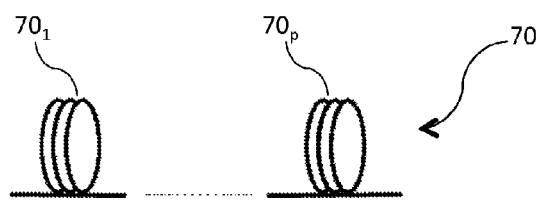
FIG. 7 illustrates an optical link according to an embodiment of the invention.

FIG. 7 illustrates an optical link 70 according to an embodiment of the invention. Such an optical link comprises p spans of optical fibers, with p≥2, which are spliced together. FIG. 7 only shows optical fiber 701 and optical fiber 70p, all the other potential optical fibers in the optical link being symbolized by dashed lines. At least one of the optical fibers in optical link 70 is such that it comprises the features of one embodiment described above. In other words, at least one of the optical fibers has a core with a single-α graded-index profile and a radius $R_1 \geq 13.5$ μm, and a cladding with a depressed trench, and is such that it fulfills the criterion $C \leq 18$. However, optical link 70 may also be such that several or all the optical fibers it comprises comply with an embodiment of the invention. Optical fiber link 70 has a length of L km, which can be of several tens or several hundreds of kilometers. In an example there are at least two spans of fiber $70_1$ and $70_2$. In another example, there are at least five spans of fibers $70_1$ to $70_5$. In yet another example, there are at least ten spans of fiber $70_1$ to $70_{10}$.

Figure 8A:
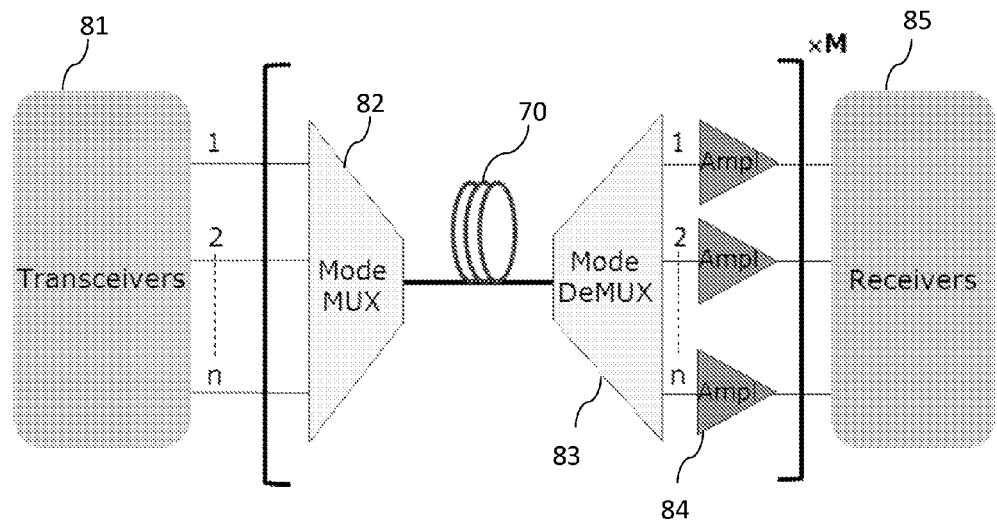
FIGS. 8A and 8B illustrate embodiments of an optical system according to the invention.
Figure 8B:
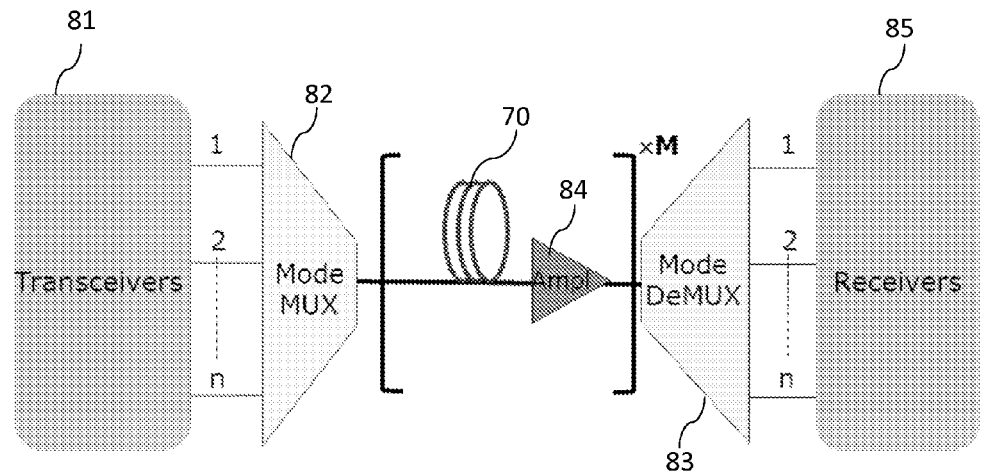

FIGS. 8A and 8B illustrate embodiments of an optical system according to the invention.

According to the first embodiment in FIG. 8A, such an optical system comprises transceivers 81 and receivers 85 optically connected by an optical fiber link 70 that includes at least one span of fiber. Transceivers 81 comprise light sources (such as lasers) and generate n LP modes, referenced 1, 2, . . . , n used in the optical system of FIG. 8A. A mode multiplexer 82 multiplexes the n LP modes and is optically connected to optical link 70, which guides the n multiplexed LP modes, towards a mode demultiplexer 83, which is optically connected to the end of optical link 70.

Mode demultiplexer 83 demultiplexes the n multiplexed LP modes, and feeds each LP mode into an amplifier 84. At the output of amplifiers 84, LP modes enter receivers 85.

Such an optical system may comprise M optical links (or M spans of optical fibers). In an example, M=1; in another example, M=2; in another example M=5; in yet another example, M=10. In case the optical system comprises M optical links or spans, it also comprises M mode multiplexers 82, M mode demultiplexers 83, and M amplifiers 84 for each LP mode guided by the optical system.

The embodiment in FIG. 8B differs from the first embodiment in FIG. 8A in that amplifier 84 amplifies all LP modes guided by the optical fiber 70; as such, amplifier 84 is optically connected between the output of optical link 70 and the input of mode demultiplexer 83. In this second embodiment, when the optical system comprises M optical links or spans, it also comprises M amplifiers 84; however, there is only one mode multiplexer 82, optically connected between transceivers 81 an optical link 70, and only one mode demultiplexer 83, optically connected between amplifier 84 and receivers 85.

The embodiments of FIGS. 8A and 8B are given as mere examples, and an optical fiber according to the invention may of course be used in any other kind of optical system.

The invention claimed is:

1. An optical fiber comprising
an optical core and
an optical cladding surrounding the optical core, the optical core having a single α graded-index profile with $\alpha \geq 1$, α being a non-dimensional parameter defining an index profile shape of the optical core, and the optical core having a radius $R_1$ and a maximal refractive index $n_0$,
wherein the optical cladding having a refractive index $n_{Cl}$ at an outer edge of the optical cladding,
wherein the optical cladding comprises a region of depressed refractive index, $n_{trench}$ being a trench, surrounding the optical core, said trench having an inner radius $R_2$, with $R_2 \geq R_1$, and an outer radius $R_3$, with $R_3 > R_2$,
wherein the optical core radius $R_1$, expressed in microns, of the optical fiber satisfies a criterion C of quality of optical communications defined by the following equation:

$$C = 10 \cdot \frac{\text{Max}|DMGDs|}{(R_1^2 \cdot Dn_1)^3}$$

where DMGD is the Differential Mode Group Delay between two guided modes in the optical fiber, where Max|DMGDs| is an absolute maximum value of DMGD between any combination of guided modes, expressed in ps/km, and where $Dn_1 = n_0 - n_{Cl}$ is a core-cladding index difference at $\lambda = \lambda_C$, where $\lambda_c$ is a central transmission wavelength of an operating band of the optical fiber, in that the α-value of the graded index profile and the optical core radius $R_1$ such that $R_1 \geq 13.5$ μm and $C \leq 18$, and that the optical fiber guides at least 4 LP modes.

2. The optical fiber according to claim 1, wherein said optical core radius $R_1$ is $R_1 \leq 20$ μm.

3. The optical fiber according to claim 1, wherein said trench satisfies the following: $55 \leq 1000 \cdot |(R_3 - R_2) \cdot Dn_3 \cdot (R_1^2 \cdot Dn_1)| \leq 150$ where $Dn_3 = n_{trench} - n_{Cl}$ is the trench-cladding index difference at $\lambda = \lambda_C$, and wherein the radii $R_1$, $R_2$, and $R_3$ are expressed in microns.

4. The optical fiber according to claim 3, wherein $Dn_3 \leq -3 \cdot 10^{-3}$.

5. The optical fiber according to claim 1, wherein the fiber guides 4 to 16 LP modes.

6. The optical fiber according to claim 1, wherein the fiber guides 6 to 16 LP modes.

7. The optical fiber according to claim 1, wherein said optical core has a minimal refractive index $n_1 = n_{Cl}$, and wherein said optical cladding also comprises an inner cladding layer directly surrounding said optical core, with an inner radius $R_1$ and an outer radius $R_2 \geq R_1$, said inner cladding layer having a constant refractive index $n_2$, such that $n_2 \neq n_{Cl}$ and $n_2 > n_{trench}$.

8. The optical fiber according to claim 1, wherein said optical core has a minimal refractive index $n_1 \neq n_{Cl}$, and wherein said optical cladding further comprises an inner cladding layer directly surrounding said optical core, with an inner radius $R_1$ and an outer radius $R_2 \geq R_1$, said inner cladding layer having a constant refractive index $n_2$, such that $n_2 = n_1$ and $n_2 > n_{trench}$.

9. The optical fiber according to claim 1, wherein said optical core has a minimal refractive index that equals $n_{Cl}$, and wherein said optical cladding further comprises an inner cladding layer directly surrounding said optical core, with an inner radius $R_1$ and an outer radius $R_2 \geq R_1$, said inner cladding layer being an extension of said single α graded-index profile of said optical core, and wherein said inner layer has a minimal refractive index $n_1 = n_{trench}$.

10. The optical fiber according to claim 1, wherein the fiber supports four LP guided modes, and wherein Max|DMGDs|<10 ps/km at $\lambda = \lambda_C$, and wherein Max|DMGDs|<20 ps/km for $\lambda \in [\lambda_C - \delta\lambda; \lambda_C + \delta\lambda]$, where $\lambda_c$ is a central transmission wavelength of an operating band for which said optical fiber is intended and where $2\delta\lambda$ is a width of said operating band.

11. The optical fiber according to claim 1, wherein the fiber supports six LP guided modes, and wherein Max|DMGDs|<15 ps/km at $\lambda = \lambda_C$, and wherein Max|DMGDs|<30 ps/km for $\lambda \in [\lambda_C - \delta\lambda; \lambda_C + \delta\lambda]$, where $\lambda_c$ is a central transmission wavelength of an operating band for which said optical fiber is intended and where $2\delta\lambda$ is a width of said operating band.

12. The optical fiber according to claim 1, wherein the fiber supports nine LP guided modes, and wherein Max|DMGDs|<60 ps/km at $\lambda = \lambda_C$, and wherein Max|DMGDs|<120 ps/km for $\lambda \in [\lambda_C - \delta\lambda; \lambda_C + \delta\lambda]$, where $\lambda_c$ is a central transmission wavelength of an operating band for which said optical fiber is intended and where $2\delta\lambda$ is a width of said operating band.

13. The optical fiber according to claim 1, wherein the fiber supports twelve LP guided modes, and wherein Max|DMGDs|<120 ps/km at $\lambda=\lambda_C$, and wherein Max|DMGDs|<250 ps/km for $\lambda \in [\lambda_C - \delta\lambda; \lambda_C + \delta\lambda]$, where $\lambda_c$ is a central transmission wavelength of an operating band for which said optical fiber is intended and where $2\delta\lambda$ is a width of said operating band.

14. The optical fiber according to claim 1, wherein the fiber supports sixteen LP guided modes, and wherein Max|DMGDs|<250 ps/km at $\lambda=\lambda_C$, and wherein Max|DMGDs|<500 ps/km for $\lambda \in [\lambda_C - \delta\lambda; \lambda_C + \delta\lambda]$, where $\lambda_c$ is a central transmission wavelength of an operating band for which said optical fiber is intended and where $2\delta\lambda$ is a width of said operating band.

15. The optical fiber according to claim 14, wherein $\lambda_c = 1550$ nm and $\delta\lambda = 20$ nm.

16. The optical fiber according to claim 15, wherein LP modes guided by said optical fiber have effective areas, $A_{eff} < 350$ μm², and bend losses <50 dB/turn, at 10 mm bend radius at 1550 nm, and wherein LP leakage modes have leakage losses >0.5 dB/m, at $\lambda=\lambda_C$.

17. An optical link comprising at least one optical fiber of claim 1.

18. An optical system comprising at least one optical fiber of claim 1.

* * * * *